(12) United States Patent
Yabusaki et al.

(10) Patent No.: US 12,227,155 B2
(45) Date of Patent: Feb. 18, 2025

(54) BRAKE DEVICE FOR VEHICLE

(71) Applicant: TOYOTA JIDOSHA KABUSHIKI KAISHA, Toyota (JP)

(72) Inventors: Naoki Yabusaki, Toyota (JP); Teppei Onodera, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 427 days.

(21) Appl. No.: 17/886,144

(22) Filed: Aug. 11, 2022

(65) Prior Publication Data

US 2023/0054637 A1 Feb. 23, 2023

(30) Foreign Application Priority Data

Aug. 19, 2021 (JP) ................. 2021-134258

(51) Int. Cl.
*B60T 17/22* (2006.01)
*B60T 11/16* (2006.01)
*B60T 13/66* (2006.01)
*B60T 13/74* (2006.01)

(52) U.S. Cl.
CPC ............ *B60T 17/221* (2013.01); *B60T 11/16* (2013.01); *B60T 13/662* (2013.01); *B60T 17/225* (2013.01); *B60T 13/741* (2013.01); *B60T 2270/402* (2013.01); *B60T 2270/406* (2013.01)

(58) Field of Classification Search
CPC .... B60T 17/221; B60T 17/225; B60T 13/662; B60T 11/16; B60T 2270/402; B60T 2270/406; B60T 13/741
See application file for complete search history.

(56) References Cited

U.S. PATENT DOCUMENTS

| 11,192,424 B2 | 12/2021 | Tabata et al. |
| 2005/0079066 A1 | 4/2005 | Tatsuya et al. |
| 2020/0180386 A1 | 6/2020 | Tabata et al. |

FOREIGN PATENT DOCUMENTS

| JP | 2004-136814 A | 5/2004 |
| JP | 2010-179799 A | 8/2010 |
| JP | 2020-093619 A | 6/2020 |

OTHER PUBLICATIONS

French Patent No. FR 2958605 to Bez published on Oct. 14, 2011 obtained from website: https://worldwide.espacenet.com.*
(Continued)

*Primary Examiner* — Pamela Rodriguez
(74) *Attorney, Agent, or Firm* — Sughrue Mion, PLLC

(57) ABSTRACT

A brake device for a vehicle includes a fluid supply portion that supplies a fluid to a wheel cylinder utilizing the fluid in a reservoir and is configured such that a piston presses brake pads against a disc rotor to apply a braking force to a wheel. The brake device includes: a fluid level sensor configured to measure a value of a fluid level in the reservoir and a controller including one or more processors and configured to: estimate a wear amount of the brake pads based on a result of measurement by the fluid level sensor; estimate a heat generation amount of the brake pads based on the result of measurement; and determine whether a fluid leakage is occurring based on i) an amount of change in the fluid level that is based on the result of the measurement, ii) the wear amount, and iii) the heat generation amount.

12 Claims, 5 Drawing Sheets

(56) References Cited

OTHER PUBLICATIONS

Translation of French Patent No. FR 2958605 obtained from website: https://worldwide.espacenet.com on Dec. 2, 2024.*
WO document No. WO 2014126054 to Oosawa et al published on Aug. 21, 2014.*

* cited by examiner

FIRST MAP

SECOND MAP

THIRD MAP

FOURTH MAP

BRAKE DEVICE FOR VEHICLE

CROSS REFERENCE TO RELATED APPLICATION

The present application claims priority to Japanese Patent Application No. 2021-134258, which was filed on Aug. 19, 2021, the disclosure of which is herein incorporated by reference in its entirety.

BACKGROUND

Technical Field

The following disclosure relates to a brake device.

Description of Related Art

A reservoir of a brake device is typically equipped with a fluid level switch configured to detect that a fluid level in the reservoir has been reduced to not greater than a threshold. The fluid level in the reservoir is reduced due to not only a hydraulic-pressure control but also natural decrease, leakage, or wear of brake pads and a rotor. When the fluid level switch detects that the fluid level is not greater than the threshold, the brake device determines that a fluid leakage is occurring from the viewpoint of failsafe and issues a warning to a driver or changes a control mode, for instance.

For instance, Japanese Patent Application Publication No. 2010-179799 describes a brake system with a simple construction including the fluid level switch and a pad wear indicator configured to detect a state of wear of the brake pads, for determining a reduction in the fluid level in the reservoir.

SUMMARY

In the meantime, brake devices suitable for the automatic brake or automated driving have been recently developed. In vehicles that exhibit functions of automatic brake or automated driving, the fluid-leakage detection associated with a driver's brake operation (such as detection of a reduction in a reaction force with respect to a brake operation) is hard to be executed. In vehicles utilized in Mobility as a Service (MaaS), for instance, it is expected that automated driving is executed and the vehicles are used multiple times in a short period. It is thus desirable to detect, at early timing, the fluid leakage, the component life, etc. In the vehicles having the functions of automatic brake and automated driving, in particular, it is desirable to detect the fluid leakage appropriately and at earlier timing and to take some measure (such as issuance of the warning).

Accordingly, an aspect of the present disclosure relates to a brake device for a vehicle capable of accurately detecting a leakage of a fluid in a reservoir.

In one aspect of the present disclosure, a brake device for a vehicle includes a fluid supply portion that supplies a fluid to a wheel cylinder utilizing the fluid in the reservoir. The brake device is configured such that a piston presses brake pads against a disc rotor in accordance with a hydraulic pressure in the wheel cylinder, so as to apply a braking force to a wheel. The brake device includes: a fluid level sensor configured to measure a value of a fluid level in the reservoir; and a controller including one or more processors and configured to: estimate a wear amount of the brake pads based on a result of measurement by the fluid level sensor; estimate a heat generation amount of the brake pads based on the result of measurement by the fluid level sensor; and determine whether a leakage of the fluid is occurring based on i): an amount of change in the fluid level that is based on the result of measurement by the fluid level sensor, ii) the wear amount, and iii) the heat generation amount.

In the determination of the fluid leakage, the brake device constructed as described above takes account of an amount of change in the thickness of the brake pads estimated based on the value of the fluid level, thus enabling accurate determination of the fluid leakage. The thickness of the brake pads becomes small due to wear and becomes large due to heat generation. For instance, under the same conditions, the fluid amount in the wheel cylinder is increased and the fluid level in the reservoir is reduced when the thickness of the brake pads becomes small whereas the fluid amount in the wheel cylinder is reduced and the fluid level in the reservoir is increased when the thickness of the brake pads becomes large. By monitoring the change in the fluid level, the condition of the brake pads can be grasped. The configuration according to the present disclosure enables accurate detection of the fluid leakage owing to the determination of the fluid leakage that takes account of the condition of the brake pads. Unlike the level switch that detects whether the fluid level is less than a predetermined value, the fluid level sensor measures the value of the fluid level such as an output value correlated with the fluid level.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
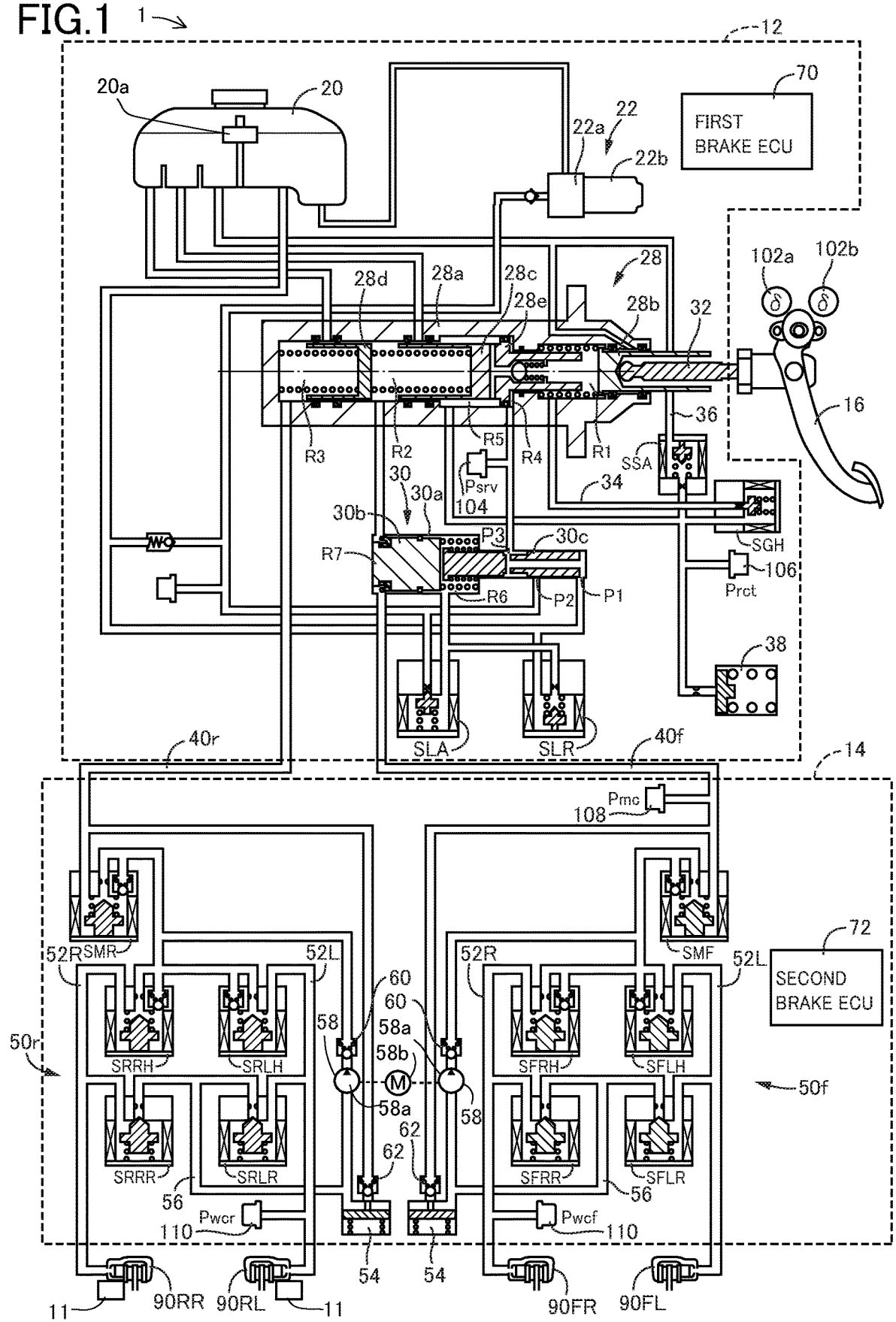
FIG. 1 is a conceptual view illustrating a configuration of a brake device for a vehicle according to one embodiment.

Referring to the drawings, there will be described in detail a brake device 1 for a vehicle according to one embodiment of the present disclosure. It is to be understood that the present disclosure is not limited to the details of following embodiment but may be embodied with various changes and modifications based on the knowledge of those skilled in the art.

A. Configuration of Brake Device

Referring to a hydraulic circuit diagram of FIG. 1, there will be described a configuration of the brake device 1 according to one embodiment of the present disclosure. The brake device 1 is configured to apply a braking force to each of four wheels, i.e., front right and left wheels and rear right and left wheels. As apparent from FIG. 1, the brake device 1 includes wheel brake devices 90FL, 90FR, 90RL, 90RR respectively provided for a front left wheel, a front right wheel, a rear left wheel, and a rear right wheel. (Hereinafter, the brake devices 90FL, 90FR, 90RL, 90RR will be each referred to as "wheel brake device 90" where appropriate.)

Figure 2:
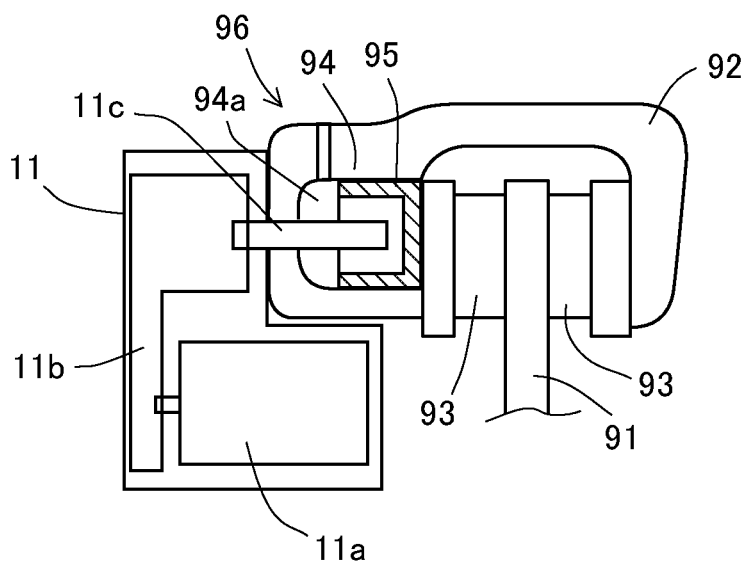
FIG. 2 is a conceptual view illustrating configurations of a wheel brake device and an electric parking brake according to the embodiment.

As illustrated in FIG. 2, the wheel brake device 90 has an ordinary configuration. For instance, the wheel brake device 90 includes a disc rotor 91 that rotates with the corresponding wheel and a brake caliper 92 supported by a carrier that rotatably holds the wheel. The brake caliper 92 includes brake pads 93, a wheel cylinder 94 to which a fluid is supplied, and an actuator 96. The actuator 96 includes a piston 95. The actuator 96 is configured to move the piston 95 by a pressure of the fluid supplied to the wheel cylinder 94 so as to press the brake pad 93 against the disc rotor 91. The piston 95 moves in accordance with a pressure in a hydraulic-pressure chamber 94a formed in the wheel cylinder 94. The hydraulic-pressure chamber 94a is defined by the piston 95 and the wheel cylinder 94. To the hydraulic-pressure chamber 94a, the fluid is supplied from the second system 14. FIG. 2 illustrates a configuration of the wheel brake device 90RR, 90RL provided for the rear wheel. The wheel brake device 90RR, 90RL is provided with an electric parking brake 11, which will be later described.

The brake device 1 includes a first system 12 and a second system 14. In terms of a flow of the fluid supplied to the wheel brake devices 90, the first system 12 may be referred to as an upstream system, and the second system 14 may be referred to as a downstream system. As later described, the fluid supplied from the first system 12 is supplied to the wheel cylinders 94 via the second system 14. The brake device 1 includes a brake pedal 16, which is one example of a brake operating member.

The first system 12 includes: a reservoir 20 in which the fluid is stored at atmospheric pressure; a first pump device 22 for pumping up the fluid in the reservoir 20; a master cylinder 28 to which the brake pedal 16 is coupled; a regulator 30, which is a pressure regulating device; and an electromagnetic pressure-increasing linear valve SLA and an electromagnetic pressure-reducing linear valve SLR. The first pump device 22 includes a pump 22a of a plunger type and a pump motor 22b configured to drive the pump 22a. The pump motor 22b is an electric motor.

The master cylinder 28 includes a housing 28a and three pistons disposed in the housing 28a, i.e., an input piston 28b, a first master piston 28c, and a second master piston 28d. An inter-piston chamber R1 is defined between the input piston 28b and the first master piston 28c in the housing 28a. A first master chamber R2 is defined between the first master piston 28c and the second master piston 28d in the housing 28a. A second master chamber R3 is defined in front of the second master piston 28d in the housing 28a (on the left side in FIG. 1). An annular servo chamber R4 is defined at the rear of a flange 28e of the first master piston 28c in the housing 28a (on the right side in FIG. 1). An annular reaction-force chamber R5 is defined in front of the flange 28e in the housing 28a. The input piston 28b is coupled to the brake pedal 16 via a rod 32.

The connection state of the reservoir 20 and the first master chamber R2 is switched from a communicating state to an isolated state when the first master piston 28c moves forward from its initial position by a predetermined amount. Likewise, the connection state of the reservoir 20 and the second master chamber R3 is switched from a communicating state to an isolated state when the second master piston 28d moves forward from its initial position by a predetermined amount. These configurations are provided by through-holes, etc., formed in the first master piston 28c and the second master piston 28d.

There is formed, in the first system 12, an inter-chamber communication passage 34 for establishing communication between the inter-piston chamber R1 and the reaction-force chamber R5. In the inter-chamber communication passage 34, an inter-chamber communication valve SGH is disposed. The inter-chamber communication valve SGH is a normally-closed electromagnetic open/close valve. The normally-closed valve is in a closed state when not energized and in an open state when energized. There is formed, in the first system 12, a reaction-force-chamber release passage 36 for establishing communication between: the reservoir 20; and a portion of the inter-chamber communication passage 34 located between the inter-chamber communication valve SGH and the reaction-force chamber R5. In the reaction-force-chamber release passage 36, a two-chamber shut-off valve SSA is disposed. The two-chamber shut-off valve SSA is a normally-open electromagnetic open/close valve. The normally-open valve is in an open state when not energized and in a closed state when energized. A stroke simulator 38 is connected to a portion of the inter-chamber communication passage 34 located between the inter-chamber communication valve SGH and the reaction-force chamber R5. The stroke simulator 38 permits a depressing operation of the brake pedal 16 while applying an operation reaction force to the brake pedal 16.

In a normal operation, the inter-chamber communication valve SGH and the two-chamber shut-off valve SSA are energized so that the inter-chamber communication valve SGH is placed in the open state and the two-chamber shut-off valve SSA is placed in the closed state. That is, the inter-piston chamber R1 and the reaction-force chamber R5 are closed while communicating with each other. A pressure receiving area of the first master piston 28c with respect to the inter-piston chamber R1 is equal to a pressure receiving area of the flange 28e of the first master piston 28c with respect to the reaction-force chamber R5. Thus, in the state in which the inter-chamber communication valve SGH and the two-chamber shut-off valve SSA are energized, the first master piston 28c does not move forward even when the fluid in the inter-piston chamber R1 is pressurized by the operation of the brake pedal 16. When the fluid is supplied to the servo chamber R4 in this state, the first master piston 28c moves forward by a force corresponding to a servo pressure that is the pressure of the fluid, and the second master piston 28d moves forward by the forward movement of the first master piston 28c. The forward movements of the first master piston 28c and the second master piston 28d cause the fluid in the first master chamber R2 and the second master chamber R3 to be pressurized to a master pressure that corresponds to the servo pressure, so that the pressurized fluid is supplied to the second system 14 via master fluid passages 40f, 40r (hereinafter each referred to as "master fluid passage 40" where appropriate).

In a case where an electric failure is occurring, the inter-chamber communication valve SGH and the two-chamber shut-off valve SSA are not energized, so that the reaction-force chamber R5 is released while the inter-piston chamber R1 is kept closed. In this state, the first master piston 28c and the second master piston 28d move forward by an operation force applied to the brake pedal 16 by a vehicle driver, without depending on the servo pressure, and the fluid having the master pressure corresponding to the operation force by the vehicle driver is supplied to the second system 14.

The regulator 30 is a pressure regulating device including a spool valve mechanism. In short, the regulator 30 includes: a casing 30a; and a piston 30b and a spool 30c disposed in the casing 30a. The piston 30b and the spool 30c are urged toward the front side (toward the left side in FIG. 1) by respective springs. In the casing 30a, a first pilot chamber R6 is defined between the piston 30b and the spool 30c, and a second pilot chamber R7 is defined in front of the piston 30b. It is noted that the second pilot chamber R7 constitutes part of the master fluid passage 40f described above.

A low-pressure port P1, a high-pressure port P2, and a regulated-pressure port P3 are formed in the casing 30a. The low-pressure port P1 is connected to the reservoir 20, the high-pressure port P2 is connected to the first pump device 22, and the regulated-pressure port P3 is connected to the servo chamber R4 of the master cylinder 28, via respective fluid passages. FIG. 1 illustrates a state in which the pressure is not introduced into the first pilot chamber R6. In this state, the spool 30c is located at its front end position, the low-pressure port P1 and the regulated-pressure port P3 are held in communication with each other, and the high-pressure port P2 and the regulated-pressure port P3 are isolated from each other. Here, the pressure of the fluid in the first pilot chamber R6 is referred to as a first pilot pressure. When the fluid having a relatively high first pilot pressure is supplied to the first pilot chamber R6, the spool 30c moves backward, the low-pressure port P1 and the regulated-pressure port P3 are isolated from each other, and the high-pressure port P2 and the regulated-pressure port P3 are brought into communication with each other. In short, the regulator 30 supplies the fluid whose pressure level corresponds to the first pilot pressure from the regulated-pressure port P3 to the servo chamber R4 of the master cylinder 28. In other words, the regulator 30 has a function of regulating the servo pressure to a pressure level corresponding to the first pilot pressure.

In the first system 12, a second pilot pressure (equal to the master pressure), which is the pressure of the fluid in the second pilot chamber R7, is slightly lower than the first pilot pressure. Thus, the piston 30b does not operate in the normal condition. However, in a situation in which the first pilot pressure is not introduced due to an electric failure or the like, for instance, the fluid having the servo pressure whose pressure level corresponds to the second pilot pressure is supplied from the regulator 30 to the master cylinder 28 until the pressure of the fluid supplied from the first pump device 22 becomes low to a certain extent.

The pressure-increasing linear valve SLA and the pressure-reducing linear valve SLR are disposed in series in a fluid passage that connects the first pump device 22 and the reservoir 20. The pressure-increasing linear valve SLA and the pressure-reducing linear valve SLR regulate the pressure of the fluid therebetween, namely, the valves SLA, SLR regulate the first pilot pressure. The pressure-increasing linear valve SLA is a normally-closed linear valve and regulates a difference between the pressure of the fluid on the upstream side thereof and the pressure of the fluid on the downstream side thereof, i.e., a pressure difference, depending on the energizing current supplied thereto. Specifically, the pressure-increasing linear valve SLA regulates the pressure difference such that the pressure difference is decreased with an increase in the energizing current supplied thereto. The pressure-reducing linear valve SLR is a normally-open linear valve and regulates a difference between the pressure of the fluid on the upstream side thereof and the pressure of the fluid on the downstream side thereof, i.e., a pressure difference, depending on the energizing current supplied thereto. Specifically, the pressure-reducing linear valve SLR regulates the pressure difference such that the pressure difference is increased with an increase in the energizing current supplied thereto. Though not described in detail, the first pilot pressure introduced into the regulator 30 is controlled by controlling the energizing current supplied to each of the pressure-increasing linear valve SLA and the pressure-reducing linear valve SLR.

The second system 14 is constituted by two systems corresponding to the two master fluid passages 40f, 40r, i.e., a front-wheel system 50f and a rear-wheel system 50r. (Hereinafter, the front-wheel system 50f and the rear-wheel system 50r will be each referred to as "system 50" where appropriate.) The second system 14 includes electromagnetic pressure-regulating linear valves SMF, SMR, pressure holding valves SFLH, SFRH, SRLH, SRRH, and pressure reducing valves SFLR, SFRR, SRLR, SRRR. Hereinafter, the pressure-regulating linear valves SMF, SMR will be each referred to as "pressure-regulating linear valve SM", the pressure holding valves SFLH, SFRH, SRLH, SRRH will be each referred to as "pressure holding valve SH", and the pressure reducing valves SFLR, SFRR, SRLR, SRRR will be each referred to as "pressure reducing valve SR" where appropriate.

In each of the front-wheel system 50f and the rear-wheel system 50r, the master fluid passage 40 branches into two to-wheel supply passages 52L, 52R (hereinafter each referred to as "to-wheel supply passage 52" where appropriate) for supplying the fluid to the right and left wheel brake devices 90, respectively. The pressure-regulating linear valve SM is disposed upstream of the branch point. The pressure holding valve SH is disposed in each to-wheel supply passage 52. The pressure reducing valve SR is disposed in a pressure reduction passage 56, which connects a reservoir 54 and a portion of each to-wheel supply passage 52 located between the pressure holding valve SH and the wheel brake device 90.

Though not described in detail, a second pump device 58 is provided in each of the front-wheel system 50f and the rear-wheel system 50r. The second pump device 58 includes a pump 58a. A pump motor 58b for driving the pumps 58a of the respective pump devices 58 is provided. In the present embodiment, the pump motor 58b is provided in common to both the front-wheel system 50f and the rear-wheel system 50r. The pump motor 58b may be provided for each second pump device 58. The second pump device 58 is configured to pump up the fluid from the reservoir 54 and supply the fluid to a portion of the to-wheel supply passage 52 located upstream of the pressure holding valve SH via a check valve 60. A portion of the master fluid passage 40 located upstream of the pressure-regulating linear valve SM is connected to the reservoir 54 via an inflow permission valve 62, which permits the fluid to flow into the reservoir 54 in a state in which the amount of the fluid in the reservoir 54 is less than a set amount.

Each pressure holding valve SH is a normally-open electromagnetic open/close valve, and each pressure reducing valve SR is a normally-closed electromagnetic open/close valve. None of the pressure holding valves SH and the pressure reducing valves SR are energized in the normal condition. The pressure holding valves SH and the pressure reducing valves SR are energized when a wheel pressure, which is a hydraulic pressure in the wheel cylinder 94 of each wheel brake device 90, is released in a case where the brake device 1 executes an antilock (ABS) operation, a traction control (TRC) operation, a vehicle stability control (VSC) operation, etc.

Each pressure-regulating linear valve SM is a normally-open electromagnetic linear valve. The pressure-regulating linear valve SM regulates a pressure difference, namely, a difference between the master pressure and the wheel pressure, depending on the energizing current supplied thereto. Specifically, the pressure-regulating linear valve SM regulates the pressure difference so as to be increased with an increase in the energizing current. By controlling the supply current to the pressure-regulating linear valves SM while driving the second pump devices 58, the fluid, whose pressure is regulated in accordance with the supply current so as to be higher than the master pressure, is supplied to each wheel brake device 90. Thus, the brake device 1 is configured such that the fluid is supplied from the first system 12 to the second system 14. Further, in a case where the master pressure is defined as a first hydraulic pressure and the wheel pressure is defined as a second hydraulic pressure, the second system 14 is configured to be capable of supplying, to each wheel brake device 90, the fluid having the second hydraulic pressure higher than the first hydraulic pressure that is the pressure of the fluid supplied from the first system 12.

The first system 12 includes a first brake ECU (electronic control unit) 70 as a controller for controlling the first system 12, and the second system 14 includes a second brake ECU (electronic control unit) 72 as a controller for controlling the second system 14. The first brake ECU 70 controls operations of the pump motor 22b of the first pump device 22, the pressure-increasing linear valve SLA, the pressure-reducing linear valve SLR, the inter-chamber communication valve SGH, the two-chamber shut-off valve SSA, for instance. The first brake ECU 70 includes a computer and drivers (drive circuits) for the pump motor 22b, the pressure-increasing linear valve SLA, the pressure-reducing linear valve SLR, the inter-chamber communication valve SGH, and the two-chamber shut-off valve SSA, etc.

The second brake ECU 72 controls operations of the pump motor 58b for the second pump devices 58, the pressure-regulating linear valves SM, the pressure holding valves SH, and the pressure reducing valves SR, etc., of the respective front-wheel system 50f and rear-wheel system 50r. The second brake ECU 72 includes a computer and drivers (drive circuits) for the pump motor 58b, the pressure-regulating linear valves SM, the pressure holding valves SH, the pressure reducing valves SR, etc. The first brake ECU 70 and the second brake ECU 72 transmit and receive information to and from each other via a CAN (controllable area network or car area network), not illustrated, to respectively control the first system 12 and the second system 14.

B. Control of Brake Device

In the normal operation, namely, in a situation in which no failure occurs in the brake device 1, the first system 12 and the second system 14 are controlled respectively by the first brake ECU 70 and the second brake ECU 72 independently of each other. Hereinafter, the control of the first system 12 and the control of the second system 14 will be described in this order.

i) Control of First System

In the first system 12, there is mainly executed a control of the master pressure. The control of the master pressure is executed by controlling the electric current supplied to each of the pressure-increasing linear valve SLA and the pressure-reducing linear valve SLR based on a pedal stroke that is an operation amount (depression amount) of the brake pedal 16. The first brake ECU 70 determines, based on the pedal stroke, a target braking force (that will also be referred to as a necessary braking force or a required braking force). In the case of automated driving, the target braking force is determined by other ECU and is transmitted to the first brake ECU 70 and the second brake ECU 72, for instance.

The brake device 1 redundantly includes two pedal stroke sensors 102a, 102b each for detecting the pedal stroke. The pedal stroke detected by the pedal stroke sensor 102a is utilized in the control of the master pressure while the pedal stroke detected by the pedal stroke sensor 102b is utilized in the control of the hydraulic pressure in the wheel cylinder 94 (hereinafter referred to as "wheel pressure" where appropriate) that will be later described.

The first brake ECU 70 determines a target servo pressure based on the target braking force. The target servo pressure is determined also based on a contribution ratio of the first system 12 in the braking force. In the brake device 1, the braking force can be controlled solely by the first system 12, solely by the second system 14, or cooperatively by the first system 12 and the second system 14. Briefly, the braking force can be controlled by controlling the pressure of the fluid supplied from the first system 12, namely, by controlling the master pressure, while keeping the pressure-regulating linear valves SM of the second system 14 in the open state. Further, even if the master pressure is kept at atmospheric pressure, the braking force can be controlled by controlling the energizing current to the pressure-regulating linear valves SM while driving the second pump devices 58 of the second system 14. Moreover, the braking force can be controlled as follows. The energizing current to the pressure-regulating linear valves SM is controlled while driving the second pump devices 58, so as to control the pressure difference between the wheel pressure and the master pressure in a state in which the pressure level of the master pressure is made lower than that of the target braking force.

In the control by the first system 12, a relatively large braking force, which requires a relatively large amount of the fluid to be supplied to each wheel brake device 90, is attained at earlier timing than in the control by the second system 14. In the control by the second system 14, the braking force rises more quickly and the followability in a region in which the braking force is relatively small is better than in the control by the first system 12. Here, the good followability means that an actual braking force is less likely to be delayed with respect to the braking force to be required. In view of the difference in the characteristics between the first system 12 and the second system 14, the brake device 1 may be configured such that contribution by the second system 14 is increased when the target braking force is relatively small while contribution by the first system 12 is increased when the target braking force is relatively large, for instance.

Based on the target servo pressure, the first brake ECU 70 determines the target first pilot pressure as a target of the first pilot pressure. Based on the target first pilot pressure, the first brake ECU 70 causes the first pump device 22 to be operated and determines the supply current to the pressure-increasing linear valve SLA and the supply current to the pressure-reducing linear valve SLR. The first brake ECU 70 supplies the determined supply currents (the energizing currents) to the corresponding electromagnetic valves. Thus, the fluid having the master pressure is supplied from the first system 12 to the second system 14.

The first system 12 includes a servo pressure sensor 104 for detecting an actual servo pressure. For instance, the target first pilot pressure may be determined according to a feedback control law based on a deviation of the actual servo pressure with respect to the target servo pressure. The first system 12 includes a reaction force pressure sensor 106 for detecting the pressure of the fluid in the stroke simulator 38 as a reaction force pressure. The target braking force may be determined based on the reaction force pressure, namely, based on a brake operation force applied to the brake pedal 16 by the vehicle driver.

ii) Control of Second Brake System

The control of the second system 14 is for controlling the wheel pressure to a value corresponding to the target braking force. The control of the wheel pressure is executed for the front-wheel system 50f and the rear-wheel system 50r independently of each other. Because the control executed for the front-wheel system 50f and the control executed for the rear-wheel system 50r are identical, the controls will be explained focusing on one control.

Like the first brake ECU 70, the second brake ECU 72 determines the target braking force. The determination of the target braking force may be performed by one of the first brake ECU 70 and the second brake ECU 72, and the other of the ECUs 70, 72 may perform the determination based on information sent from the one of the ECUs 70, 72 via the CAN.

The second brake ECU 72 determines the target wheel pressure based on the target braking force. The second brake ECU 72 executes various controls based on a difference between the actual master pressure detected by a pressure sensor 108 and the target wheel pressure, i.e., a pressure difference ΔP. When the actual master pressure is less than the target wheel pressure, the second brake ECU 72 causes the second pump device 58 to be driven and determines the energizing current supplied to the pressure-regulating linear valve SM based on the pressure difference ΔP. The second brake ECU 72 supplies the determined energizing current to the pressure-regulating linear valve SM. When the pressure difference ΔP is 0, the second brake ECU 72 stops operating the second pump device 58 and determines the energizing current to be 0.

The second system 14 includes pressure sensors 110 each provided for a corresponding one of the front-wheel system 50f and the rear-wheel system 50r for detecting an actual wheel pressure. The energizing current supplied to the pressure-regulating linear valve SM may be determined according to a feedback control law based on a deviation of the actual wheel pressure with respect to the target wheel pressure. As in the control of the master pressure in the first system 12, the target braking force may be determined based on the reaction force pressure. It is noted that the wheel pressure may be estimated based on a control status.

Figure 3:
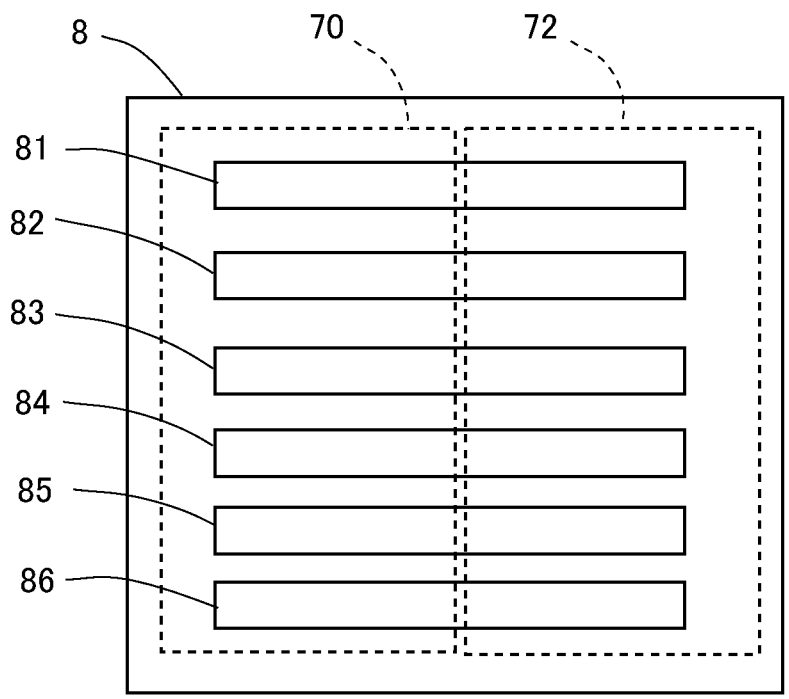
FIG. 3 is a conceptual view illustrating a configuration of a controller according to the embodiment.

The first brake ECU 70 and the second brake ECU 72 communicate with each other, so that the two ECUs 70, 72 operate in a coordinated fashion or in conjunction with each other. It can be said that one controller 8 for controlling the brake device 1 is constituted by the first brake ECU 70 and the second brake ECU 72, as illustrated in FIG. 3. The controller 8 includes one or more processors and one or more memory. Hereinafter, the first brake ECU 70 and the second brake ECU 72 will be collectively referred to as the controller 8 where appropriate. As described above, the brake device 1 includes the first system 12 and the second system 14 as one example of the fluid supply portion that supplies the fluid to the wheel cylinder 94 of each brake device 90 utilizing the fluid in the reservoir 20. The brake device 1 is configured to apply the braking force to each wheel by pressing the brake pads 93 against the disc rotor 91 in accordance with the wheel pressure.

The brake device 1 according to the present embodiment is an on-demand hydraulic brake device not including an accumulator (high-pressure source). Thus, the fluid level in the reservoir 20, i.e., a remaining amount of the fluid in the reservoir 20, varies in conjunction with the wheel pressure, i.e., the amount of the fluid supplied to the wheel cylinders 94. Roughly speaking, the amount of the fluid supplied to each wheel cylinder 94 increases and the fluid level in the reservoir 20 is reduced with an increase in the wheel pressure. In other words, it can be said that the fluid level in the reservoir 20 is lowered by a control of increasing the braking force, i.e., a control of moving the piston 95 forward and that the fluid level in the reservoir 20 is raised by a control of decreasing the braking force, i.e., a control of moving the piston 95 backward.

C. Electric Parking Brake

An electric parking brake 11 is provided for each of the wheel brake devices 90RR, 90RL of the rear wheels. As illustrated in FIG. 2, the electric parking brake 11 is configured to convert a rotary motion of the output shaft of the electric motor 11a into a linear motion of a linearly movable member 11c by a motion converting mechanism 11b and to cause the linearly movable member 11c to press the piston 95 to thereby move the piston 95. The electric motor 11a is controlled by the controller 8, for instance. The motion converting mechanism 11b is constituted by a plurality of gears. The motion converting mechanism 11b functions as a speed reducing mechanism and converts the rotary motion of the output shaft into the linear motion of the linearly movable member 11c.

When the electric parking brake 11 is activated by an operation of the vehicle driver, for instance, the electric motor 11a is operated to cause the linearly movable member 11c to press the piston 95, so that the brake pads 93 are pressed against the disc rotor 91 by the piston 95 to generate the braking force. The electric parking brake 11 is provided with a known lock mechanism for prohibiting the movement of the linearly movable member 11c. In the state in which the braking force is generated by the movement of the linearly movable member 11c, the lock mechanism locks the linearly movable member 11c. Thus, the state in which the braking force is generated is maintained without the electric motor 11a being powered. In the locked state of the electric parking brake 11, the braking force is being applied to the wheel.

The electric parking brake 11 is normally activated by a vehicle driver's manipulation of a switch or the like in a state in which the vehicle is at standstill and the braking force is being generated by depression of the brake pedal 16. Accordingly, the brake pads 93 are further pressed against the disc rotor 91 by the linearly movable member 11c and the piston 95 from the state of pressing the disc rotor 91. That is, the activation of the electric parking brake 11 causes the piston 95 to move forward, so that the volume of the hydraulic-pressure chamber 94a of the wheel cylinder 94 is increased.

When the electric parking brake 11 is turned off, the piston 95 moves backward to a predetermined position. In this state, the piston 95 is movable forward and backward in accordance with the pressure in the hydraulic-pressure chamber 94a. At an initial position of the piston 95, the linearly movable member 11c and the piston 95 do not contact each other, and the piston 95 is movable forward and backward. The initial position of the piston 95 is, for instance, a position of the piston 95 in a state in which the brake operation has never been performed and the wheel pressure is equal to atmospheric pressure. In the description of the present specification, the direction in which the piston 95 moves toward the disc rotor 91 (i.e., the direction in which the hydraulic-pressure chamber 94*a* is enlarged) is defined as a forward direction, and the direction in which the piston 95 moves away from the disc rotor 91 (i.e., the direction in which the hydraulic-pressure chamber 94*a* is narrowed) is defined as a backward direction. A clamping force of the electric parking brake 11 is a force by which the brake pads 93 clamp the disc rotor 91. The clamping force increases as the piston 95 moves forward, namely, the clamping force increases with an increase in a control current of the electric motor 11*a*, for instance.

D. Fluid-Leakage Detection

The brake device 1 monitors the fluid level in the reservoir 20 and monitors whether the fluid leakage is occurring. The brake device 1 includes a fluid level sensor 20*a* and the controller 8. As illustrated in FIG. 3, the controller 8 includes a wear-amount estimating portion 81, a heat-generation-amount estimating portion 82, a reduction-amount estimating portion 83, a fluid-leakage determining portion 84, a work-amount estimating portion 85, and a replacement-timing determining portion 86. Functions of the portions 81-85 are effectuated by the controller 8. In this respect, the brake device 1 may include another ECU having the functions of the portions 81-85, which is an electronic control unit including one or more processors like other ECUs. The embodiment will be described hereinafter assuming that automated driving or automatic brake is mainly performed. For instance, a description as to a work amount of the second system 14, etc., will be made on the precondition that the reservoir 20 and the second system 14 (as one example of the fluid supply portion) are held in communication with each other, namely, the master pistons 28*c*, 28*d* are not moved forward.

The fluid level sensor 20*a* measures a value of a level of the fluid in the reservoir 20. The fluid level sensor 20*a* is a known level sensor (level meter) of a capacitance type, an ultrasonic type, or the like. The fluid level sensor 20*a* measures the value of the fluid level all the time utilizing an output value that changes proportionately with the change in the fluid level in the reservoir 20 such as a current value, a voltage value, or a capacitance. The fluid level sensor 20*a* is configured such that the output value linearly changes with respect to the change in the fluid level. For instance, the capacitance level sensor is capable of detecting the fluid level by measuring the capacitance based on a correlation between the fluid level and the capacitance. In this instance, the level sensor is constructed such that the fluid surface is located between two electrodes, for instance. The fluid level sensor 20*a* is constituted such that the output value changes with respect to the change in the fluid level per unit level, for instance. Unlike the level switch, the level sensor is typically capable of detecting the fluid level value each time when the fluid level changes or every unit time. The level switch can detect that the fluid level is lower than a constant value but cannot measure the fluid level value. Any known level sensors are employable as the fluid level sensor 20*a*, and a detailed description of the configuration of the fluid level sensor 20*a* is dispensed with. The fluid level sensor 20*a* transmits regularly, e.g., at a short cycle, the detection result to the controller 8, for instance. It can be said that the fluid level sensor 20*a* linearly changes the output with respect to the change in the fluid level. It can be further said that the fluid level sensor 20*a* detects the fluid level linearly, e.g., continuously.

Estimation of Wear Amount

The wear-amount estimating portion 81 estimates a wear amount of the brake pads 93 based on a result of measurement by the fluid level sensor 20*a*. Based on the measurement result by the fluid level sensor 20*a*, the wear-amount estimating portion 81 records the fluid level at every predetermined timing continuously from a brand-new state of the vehicle or replaced timing of the brake pads 93. The predetermined timing is set to timing immediately after the electric parking brake 11 is turned off in a state in which ignition (key switch) is turned on. For instance, the predetermined timing is set to timing when the braking force is being generated by the hydraulic pressure, namely, timing before the brake pedal 16 is released in a state in which the electric parking brake 11 is turned off and the ignition is turned on.

The fluid level detected at the predetermined timing is the fluid level when the brake pads 93 are being pressed against the disc rotor 91, namely, when the braking force is being generated, in a state in which the ignition is turned on and the magnitude of the clamping force of the electric parking brake 11 is not relevant to the fluid level. That is, the state in which the fluid level is detected in the present embodiment is a state in which the piston 95 has moved forward by the wheel pressure. It can be said that the predetermined timing is timing at which a predetermined braking force is being generated only by the wheel pressure before the vehicle starts after the turning on of the ignition.

The wear-amount estimating portion 81 records information on the fluid level at the predetermined timing and calculates a difference between: a present fluid level in present measurement; and an initial fluid level in initial measurement and at normal temperature (e.g., the fluid level when the brake pads 93 are brand-new and at normal temperature). That is, the wear-amount estimating portion 81 calculates an amount of change in the fluid level from the initial measurement (hereinafter referred to as "aging-dependent fluid-level change amount" where appropriate). The record of the fluid level at the initial measurement is reset when the brake pads 93 are replaced, for instance.

Figure 4:
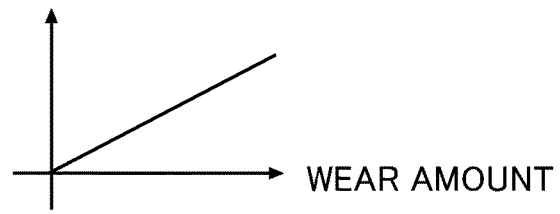
FIG. 4 is a view illustrating a first map according to the embodiment.

The wear-amount estimating portion 81 receives information on a heat generation amount of the brake pads 93 (that will be later described) from the heat-generation-amount estimating portion 82 and estimates the wear amount of the brake pads 93 based on the aging-dependent fluid-level change amount and the heat generation amount. The amount of the forward movement of the piston 95 for generating the braking force increases with an increase in the wear amount of the brake pads 93. That is, the volume of the hydraulic-pressure chamber 94*a* in the state in which the braking force is being generated increases with an increase in the wear amount of the brake pads 93, and the fluid amount supplied from the reservoir via the fluid circuit is accordingly increased. When not considering the heat generation amount, the fluid level at the predetermined timing is reduced with an increase in the wear amount of the brake pads 93. Thus, there exists a positive correlation between the aging-dependent fluid-level change amount and the wear amount of the brake pads 93. As illustrated in FIG. 4, the fluid-leakage determining portion 84 stores in advance a first map representing a relationship between the aging-dependent fluid-level change amount (i.e., the reduction amount) and the wear amount.

When considering the heat generation amount, as the heat generation amount of the brake pads 93 increases, the brake pads 93 expand and the forward movement amount of the piston 95 for generating the braking force becomes small.

That is, the volume of the hydraulic-pressure chamber 94a in the state in which the braking force is being generated decreases with an increase in the heat generation amount of the brake pads 93, and the fluid amount to be required accordingly becomes small. Based on the findings, the wear-amount estimating portion 81 calculates the wear amount of the brake pads 93 based on a product of a value obtained by subtracting the heat generation amount (i.e., the expansion amount) from the aging-dependent fluid-level change amount and a constant (coefficient), e.g., the wear amount=(the aging-dependent fluid-level change amount– the heat generation amount)×the constant.

The wear-amount estimating portion 81 calculates the wear amount based on information on the latest heat generation amount received from the heat-generation-amount estimating portion 82, for instance. In a case where a predetermined length of time or more has elapsed from the time of estimation (calculation) of the latest heat generation amount, for instance, the wear-amount estimating portion 81 calculates the wear amount by setting the heat generation amount to 0.

Estimation of Heat Generation Amount

The heat-generation-amount estimating portion 82 estimates the heat generation amount of the brake pads 93 based on the measurement result by the fluid level sensor 20a. Each time when one brake operation is completed, the heat-generation-amount estimating portion 82 calculates the heat generation amount based on a difference between the fluid level immediately before the start of the brake operation and the fluid level immediately after the completion of the brake operation. This difference will be hereinafter referred to as "brake-operation-dependent fluid-level change amount" where appropriate. In the case of manual driving, the one brake operation is a process executed from when the brake pedal 16 is depressed to when the brake pedal 16 returns to the initial position. In the case of automated driving, the one brake operation is a process executed from when the braking force is generated by the wheel pressure to when the braking force becomes equal to 0.

The heat-generation-amount estimating portion 82 keeps recording the measurement result of the fluid level sensor 20a. When one brake operation is completed, the heat-generation-amount estimating portion 82 subtracts the fluid level immediately before the start of the brake operation from the fluid level immediately after the completion of the brake operation. The heat-generation-amount estimating portion 82 calculates the heat generation amount of the brake pads 93 based on a product of a value obtained by the subtraction (i.e., the brake-operation-dependent fluid-level change amount) and a constant (coefficient), e.g., the heat generation amount=the brake-operation-dependent fluid-level change amount×the constant. There exists a relationship, e.g., a positive correlation, between the heat generation amount and the expansion amount. Thus, the expansion amount can be estimated from the heat generation amount.

When the brake pads 93 generate heat and expand due to the brake operation, the contact of the brake pads 93 and the disc rotor 91 is not cancelled after expansion at a position of the piston 95 where the brake pads 93 and the disc rotor 91 are not in contact before expansion. In this case, the piston 95 is pushed backward further from the initial position. That is, the expansion of the brake pads 93 causes the volume of the hydraulic-pressure chamber 94a to be decreased and causes the fluid level in the reservoir 20 to be increased.

Figure 5:
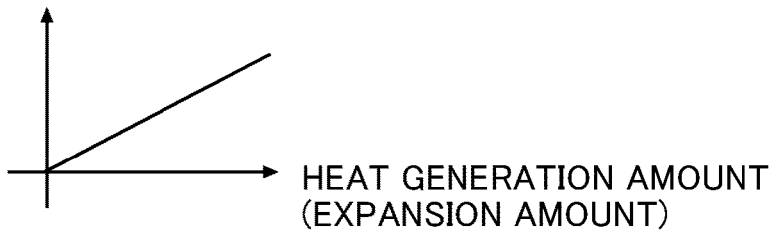
FIG. 5 is a view illustrating a second map according to the embodiment.

Thus, there exists a positive correlation between the brake-operation-dependent fluid-level change amount (i.e., the increase amount) and the heat generation amount of the brake pads 93. As illustrated in FIG. 5, the fluid-leakage determining portion 84 stores in advance a second map representing the relationship between the brake-operation-dependent fluid-level change amount and the heat generation amount. Based on the findings, the heat-generation-amount estimating portion 82 estimates the heat generation amount of the brake pads 93. The heat-generation-amount estimating portion 82 transmits information on the heat generation amount to the wear-amount estimating portion 81 and the fluid-leakage determining portion 84 each time when the heat generation amount is estimated or as needed.

The heat-generation-amount estimating portion 82 records the heat generation amount for every estimation and calculates an integrated value of the heat generation amount, i.e., a total heat generation amount. The integrated value is a total value of the heat generation amounts, for instance. The heat generation amount in initial recording results from the brake operation initially performed in a brand-new state of the vehicle or the brake operation initially performed after replacement of the brake pads 93. The integrated value is stored as a total thermal load of the brake pads 93.

Estimation of Fluid-Level Reduction Amount Arising from Braking

Figure 6:
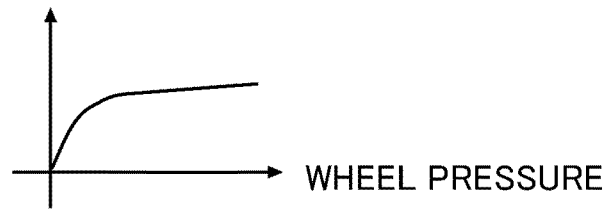
FIG. 6 is a view illustrating a third map according to the embodiment.
Figure 7:
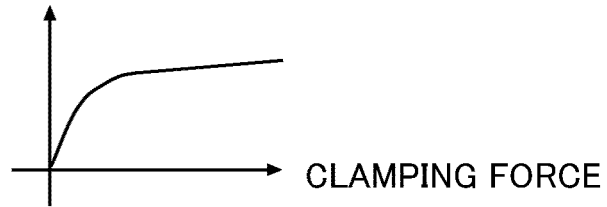
FIG. 7 is a view illustrating a fourth map according to the embodiment.

The reduction-amount estimating portion (corresponding to "WC reduction-amount estimating portion" and "EPB reduction-amount estimating portion") 83 estimates an amount of reduction in the fluid level arising from an increase in the braking force. The reduction-amount estimating portion 83 estimates the reduction amount of the fluid level based on a generation status of the braking force, specifically, based on the wheel pressure or the clamping force of the electric parking brake 11. As illustrated in FIGS. 6 and 7, the reduction-amount estimating portion 83 stores: a third map representing a relationship between the wheel pressure and the change amount of the fluid level (i.e., the reduction amount); and a fourth map representing a relationship between the clamping force of the electric parking brake 11 and the change amount of the fluid level (i.e., the reduction amount).

The reduction-amount estimating portion 83 estimates a change amount "c1" of the fluid level arising from the hydraulic-pressure control based on information on the wheel pressure (i.e., the detection value by the pressure sensor 110) and the third map. The reduction-amount estimating portion 83 further estimates a change amount "c2" of the fluid level arising from the operation of the electric parking brake 11 based on the clamping force and the fourth map. The clamping force of the electric parking brake 11 is adjusted, for instance, by inclination of the road surface when the vehicle is at standstill. The controller 8 recognizes the clamping force (e.g., the rotational position of the electric motor 11a), and the fluid-leakage determining portion 84 can obtain present clamping force information. The reduction-amount estimating portion 83 transmits information on the fluid-level change amounts c1, c2 to the fluid-leakage determining portion 84.

Fluid-Leakage Determination

The fluid-leakage determining portion 84 determines the presence or absence of the fluid leakage based on the measurement result by the fluid level sensor 20a, the wear amount estimated by the wear-amount estimating portion 81, the heat generation amount estimated by the heat-generation-amount estimating portion 82, and the reduction amount estimated by the reduction-amount estimating portion 83 (corresponding to "WC reduction amount" and "EPB reduction amount").

The fluid-leakage determining portion 84 stores the fluid level in the brake operation performed immediately after replacement of the brake pads 93 and at normal temperature, namely, the fluid level when the electric parking brake 11 is not operating. The value of the recorded fluid level is the same as the value of the initial fluid level utilized in calculation by the wear-amount estimating portion 81 and will be hereinafter referred to as "initial fluid level" where appropriate.

The fluid-leakage determining portion 84 executes a fluid-leakage determination program at a short cycle. Each time when executing the program, the fluid-leakage determining portion 84 calculates a difference between the present fluid level and the initial fluid level (hereinafter referred to as "present fluid-level change amount" where appropriate). The fluid-leakage determining portion 84 compares the present fluid-level change amount ΔL to a fluid leakage threshold Th. When the present fluid-level change amount ΔL is greater than the fluid leakage threshold Th, the fluid-leakage determining portion 84 determines that the fluid leakage is occurring and gives the vehicle driver a warning by a display or a voice message, for instance.

The fluid-leakage determining portion 84 determines the fluid leakage threshold Th based on the wear amount estimated by the wear-amount estimating portion 81, the heat generation amount estimated by the heat-generation-amount estimating portion 82, and the reduction amount estimated by the reduction-amount estimating portion 83. The fluid-leakage determining portion 84 estimates a change amount "a" of the fluid level arising from the wear of the brake pads 93 based on the pre-stored relationship between the wear amount of the brake pads 93 and the change amount of the fluid level (i.e., the first map of FIG. 4) and the information on the latest wear amount estimated by the wear-amount estimating portion 81.

The fluid-leakage determining portion 84 estimates a change amount "b" of the fluid level arising from the heat generation of the brake pads 93 based on the pre-stored relationship between the heat generation amount of the brake pads 93 and the change amount of the fluid level (i.e., the second map of FIG. 5) and the information on the latest heat generation amount estimated by the heat-generation-amount estimating portion 82. In a case where a predetermined length of time has elapsed from the time of calculation of the latest heat generation amount, the fluid-leakage determining portion 84 may set the heat generation amount to 0.

The fluid-leakage determining portion 84 obtains, from various portions, information on the fluid-level change amount "a" based on the wear amount, the fluid-level change amount "b" based on the heat generation amount (the expansion amount), the fluid-level change amount (the WC reduction amount) "c1" based on the wheel pressure, and the fluid-level change amount (the EPB reduction amount) "c2" based on the clamping force. The fluid-leakage determining portion 84 determines the fluid leakage threshold Th based on a constant X and the fluid-level change amounts a, b, c1, c2. The constant X is set from the viewpoint of preventing erroneous detection. The fluid leakage threshold Th is determined according to the following expression, for instance. Though the fluid-level change amounts c1, c2 need not necessarily be utilized, the accuracy in determination of the fluid leakage is enhanced through the use of the fluid-level change amounts c1, c2.

$$Th = X - a + b - (c1 + c2)$$

The fluid-level change amount "a" arises from the wear of the brake pads 93. The fluid-level change amount "a" is an amount of change in the direction of decrease of the fluid level. In a state in which the fluid level is reduced due to the wear, a margin of the remaining amount of the fluid in the reservoir 20 with respect to the decrease in the fluid level that arises from the hydraulic-pressure control (the pressure-increase control) of the systems 12, 14 is smaller, as compared with that in a state in which the brake pads 93 are not worn. That is, in the state in which the fluid level is decreased due to the wear of the brake pads 93, the reservoir 20 is relatively likely to become empty. It is thus preferable to issue a warning at early timing when there is a possibility of the fluid leakage. In the automated driving vehicle, in particular, the fluid-leakage detection based on the reaction force value at the time of depression of the brake pedal 16 is not performed, and there is a possibility that the accuracy of the fluid-leakage detection is lowered. It is thus desirable to detect the fluid-leakage at early timing. The fluid-leakage determining portion 84 decreases the fluid leakage threshold Th by subtracting the fluid-level change amount "a" from the constant X in calculating the fluid leakage threshold Th. This is for allowing determination of the presence of the fluid leakage to be made at a stage where the present fluid-level change amount is relatively small in a state in which the brake pads 93 are worn.

The fluid-level change amount "b" arises from the heat generation amount (i.e., the expansion amount) of the brake pads 93. The fluid-level change amount "b" is an amount of change in the direction of increase of the fluid level. In a state in which the fluid level is increased due to the expansion of the brake pads 93, the margin of the remaining amount of the fluid in the reservoir 20 with respect to the decrease in the fluid level that arises from the hydraulic-pressure control (the pressure-increase control) of the systems 12, 14 is larger, as compared with that in a state in which the brake pads 93 are not expanded. That is, in the state in which the fluid level is increased due to the expansion of the brake pads 93, the reservoir 20 is relatively not likely to become empty. Thus, the fluid-leakage determining portion 84 increases the fluid leakage threshold Th by adding the fluid-level change amount "b" to the constant X in calculating the fluid leakage threshold Th.

The fluid-level change amount "c1" arises from the pressure-increase control executed by the first system 12 and/or the second system 14. The fluid-level change amount "c 1" is an amount of change in the direction of decrease of the fluid level. As described above with respect to the fluid-level change amount "a", the fluid-leakage determining portion 84 decreases the fluid leakage threshold Th by subtracting the fluid-level change amount "c1" from the constant X in calculating the fluid leakage threshold Th for enabling the fluid leakage to be detected at early timing.

The fluid-level change amount "c2" arises from the operation of the electric parking brake 11 from its released state to its locked state. The fluid-level change amount "c2" is an amount of change in the direction of decrease of the fluid level. As described above with respect to the fluid-level change amount "a", the fluid-leakage determining portion 84 deceases the fluid leakage threshold Th by subtracting the fluid-level change amount "c2" from the constant X in calculating the fluid leakage threshold Th for enabling the fluid leakage to be detected at early timing. In this way, the fluid-leakage determining portion 84 determines the presence or absence of the fluid leakage based on the above expression. Each of the maps described above is created based on results of a fluid-level change test conducted in advance. The occurrence of the fluid leakage may be determined when the fluid level is reduced in a state in which the wheel pressure is constant such as during execution of a wheel-pressure holding control in which the wheel pressure is held.

Summary of Fluid-Leakage Determination

The brake device 1 includes the first system 12 and the second system 14 functioning as the fluid supply portion and configured to supply the fluid to the wheel cylinder 94 of each wheel brake device 90 utilizing the fluid in the reservoir 20. The brake device 1 is configured such that the piston 95 presses the brake pads 93 against the disc rotor 91 in accordance with the wheel pressure, so as to apply the braking force to the wheel. The brake device 1 includes the fluid level sensor 20a configured to measure the value of the fluid level in the reservoir 20, the wear-amount estimating portion 81 configured to estimate the wear amount of the brake pads 93 based on the result of measurement by the fluid level sensor 20a, the heat-generation-amount estimating portion 82 configured to estimate the heat generation amount of the brake pads 93 based on the result of measurement by the fluid level sensor 20a, and the fluid-leakage determining portion 84 configured to determine whether the fluid leakage is occurring based on the change amount of the fluid level, the wear amount, and the heat generation amount.

In the fluid-leakage determination, the brake device 1 constructed as described above takes account of the amount of change in the thickness of the brake pads 93 estimated based on the measured fluid level value, thus enabling accurate fluid-leakage determination. The thickness of the brake pads 93 becomes small due to the wear and becomes large due to the heat generation. Under the same conditions, the fluid amount in the wheel cylinder 94 is increased and the fluid level in the reservoir 20 is reduced when the thickness of the brake pads 93 becomes small whereas the fluid amount in the wheel cylinder 94 is decreased and the fluid level in the reservoir 20 is increased when the thickness of the brake pads 93 becomes large. By monitoring the change in the fluid level, the condition of the brake pads 93 can be grasped. The configuration according to the present disclosure enables accurate detection of the fluid leakage owing to the fluid-leakage determination that takes account of the condition of the brake pads 93. Unlike the level switch that detects whether the fluid level is less than a predetermined value, the fluid level sensor 20a measures the value of the fluid level such as the output value correlated with the fluid level.

The brake device 1 further includes the reduction-amount estimating portion 83 configured to estimate, based on the wheel pressure, the reduction amount of the fluid level arising from the operations of the first system 12 and the second system 14, i.e., the WC reduction amount. Further, the fluid-leakage determining portion 84 is configured to determine whether the fluid leakage is occurring also based on the reduction amount, i.e., the fluid-level change amount "c1". This configuration enables the fluid-leakage determination that matches the present generation status of the braking force, namely, the fluid-leakage determination that takes account of the fluid amount utilized in generating the braking force, thus enhancing the accuracy of the fluid-leakage determination.

The brake device 1 further includes the electric parking brake 11 configured to move the piston 95 by the force of the electric motor 11a. The reduction-amount estimating portion 83 estimates, based on the clamping force of the electric parking brake 11, the reduction amount of the fluid level arising from the operation of the electric parking brake 11, i.e., the EPB reduction amount. Further, the fluid-leakage determining portion 84 is configured to determine whether the fluid leakage is occurring also based on the reduction amount, i.e., the fluid-level change amount "c2". This configuration enables the fluid-leakage determination that matches the operating status of the electric parking brake 11, thus enhancing the accuracy of the fluid-leakage determination. The brake device 1 according to the present embodiment enables the fluid-leakage determination that takes account of various changes in the fluid amount when the brake device 1 is normally operating. Accordingly, the fluid leakage can be detected at early timing, and the warning can be issued at early timing.

E. Replacement-Timing Determination

Estimation of Work Amount

The work-amount estimating portion 85 estimates a work amount of the pump motor 22b of the first pump device 22 and a work amount of the pump motor 58b of the second pump devices 58 based on the result of measurement by the fluid level sensor 20a. The work-amount estimating portion 85 estimates the work amounts of the pump motors 22b, 58b based on: a change amount of the detection value by each pressure sensor 110 (i.e., the wheel pressure) per unit time; and the corresponding change amount of the fluid level per unit time (hereinafter referred to as "per unit fluid-level change amount" where appropriate). In this respect, the work-amount estimating portion 85 may utilize a change amount of the target wheel pressure per unit time, in place of the change amount of the detection value by each pressure sensor 110 per unit time (hereinafter referred to as "pressure change amount" where appropriate).

The work-amount estimating portion 85 estimates the work amount based on a product obtained by multiplying the pressure change amount by the per unit fluid-level change amount, e.g., the work amount=the pressure change amount×the per unit fluid-level change amount. The work-amount estimating portion 85 determines the operating states of the pump motor 22b and the pump motor 58b based on the control status of the controller 8. The work-amount estimating portion 85 estimates the work amount of the pump motor 22b according to the calculation described above in a case where only the pump motor 22b is operating. The work-amount estimating portion 85 estimates the work amount of the pump motor 58b according to the calculation described above in a case where only the pump motor 58b is operating.

In a case where both the pump motors 22b, 58b are operating, the work-amount estimating portion 85 estimates the work amount of each pump motor 22b, 58b based on the contribution ratio and/or the pressure values (i.e., the master pressure and the wheel pressure), for instance. In a case where the pedal stroke influences the fluid level in manual driving, the work-amount estimating portion 85 may correct the per unit fluid-level change amount based on the detection values by the pedal stroke sensors 102a, 102b.

The work-amount estimating portion (corresponding to "EPB work-amount estimating portion") 85 estimates also a work amount of the electric motor 11a of the electric parking brake 11. The work-amount estimating portion 85 estimates the work amount of the electric motor 11a (corresponding to "EPB work amount") based on: the change amount of the wheel pressure per unit time (i.e., the pressure change amount); and the corresponding change amount of the fluid level per unit time (i.e., the per unit fluid-level change amount), in the operation of the electric parking brake 11 (from its released state to its locked state or vice versa). As described above with respect to the estimation of the work amount of each pump motor 22b, 58b, the work-amount estimating portion 85 estimates the work amount of the electric motor 11a based on a product of the pressure change amount and the per unit fluid-level change amount, e.g., the work amount=the pressure change amount×the per unit fluid-level change amount. The work amount estimated by the calculation differs depending on different change amounts of the fluid level per unit time.

The work-amount estimating portion 85 also estimates, for each of the pump motors 22b, 58b and the electric motor 11a, a total work amount that is a sum of the work amounts. Each total work amount is reset when a corresponding one of the pump motors 22b, 58b and the electric motor 11a is replaced. Each time when the fluid level changes by execution of the control, for instance, the work-amount estimating portion 85 may calculate the work amount of each of the motors and drive circuits (such as the pumps and electromagnetic valves) for the operation thereof and may calculate the total work amount (that may also be referred to as a load) of each element. In a case where one element performs similar operations (such as in a case where the change amount of the fluid level is the same among the operations), the work-amount estimating portion 85 may calculate the total work amount by multiplying the number of operations by the work amount. The work-amount estimating portion 85 may add up the work amounts for the operation of each element and may calculate the load of each element. The total work amount of the electric motor 11a may be referred to as a total EPB work amount.

Replacement-Timing Determination

The replacement-timing determining portion (corresponding to "pad replacement-timing determining portion", "motor replacement-timing determining portion" or "EPB replacement-timing determining portion") 86 stores, for each element, a replacement threshold based on results of a durability test conducted in advance. For instance, the replacement-timing determining portion 86 stores in advance the replacement threshold of each of the pump motors 22b, 58b and the electric motor 11a and compares the total work amount of each of the motors 22b, 58b, 11a to the corresponding replacement threshold. When the total work amount exceeds the replacement threshold, the replacement-timing determining portion 86 notifies the vehicle driver, by a display or a voice massage, that the element in question has reached its end of estimated life. For instance, the replacement-timing determining portion 86 notifies the vehicle driver that the element in question has reached its replacement timing or the element in question will probably be out of order soon. It can be said that the replacement-timing determining portion 86 may predict a failure by comparing the total work amount to the replacement threshold.

Summary of Replacement-Timing Determination

The brake device 1 includes the replacement-timing determining portion 86 configured to determine timing of replacement of the brake pads 93, namely, to determine whether the brake pads 93 has reached the end of their life, based on at least one of the estimated wear amount and the estimated heat generation amount, namely, based on the estimated wear amount and/or the estimated heat generation amount. This configuration enables the vehicle driver to be notified of the replacement timing of the brake pads 93 with high accuracy.

The brake device 1 includes the work-amount estimating portion 85 configured to estimate, based on the measurement result by the fluid level sensor 20a and the wheel pressure, the work amount of the pump motor 22b of the first system 12, the work amount of the pump motor 58b of the second system 14, the work amount of the electric motor 11a, and the total work amount that is an integrated value of the work amount obtained for each of the pump motor 22b, the pump motor 58b, and the electric motor 11a. The replacement-timing determining portion 86 is configured to determine timing of replacement of each of the pump motors 22b, 58b and the electric motor 11a, namely, to determine whether each of the pump motors 22b, 58b and the electric motor 11a has reached the end of its life, based on the total work amount. This configuration enables the vehicle driver to be notified of the replacement timing of each of the pump motors 22b, 58b and the electric motor 11a with high accuracy.

The wear of components is conventionally checked visually by workers, for instance, thus requiring mounting and demounting of components. Further, in a case where the replacement timing is determined or estimated, only the number of times the operation has been performed is usually considered. In other words, the operation performed under different load situations is treated as being performed under the same load situation. Thus, there is a room for improvement in terms of the determination accuracy. In a case where the status of use largely differs among individual vehicles such as the MaaS vehicles, the determination of the replacement timing of the components needs to be made for the individual vehicles. In the present embodiment, the work amount is estimated based on the fluid-level change amount that changes depending upon the operational load, thus enabling the replacement timing of the components to be determined for the individual vehicles. The determination of the replacement timing of the motor (i.e. the estimation of the work amount) includes not only a determination of the replacement timing of the motor body but also a determination of the replacement timing of a motor drive circuit (such as an inverter). In a case where the motor, which is subject to the replacement timing determination, is a brushed motor, the replacement timing of the motor is largely influenced by the replacement timing of the brush. In this case, the replacement timing of the motor determined by the controller 8 may be referred to as the replacement timing of the motor body. In a case where the subject motor is a brushless motor, the degree of influence of the replacement timing of the motor drive circuit (the inverter) on the replacement timing of the motor is high. In this case, the replacement timing of the motor determined by the controller 8 may be referred to as the replacement timing of the motor drive circuit.

F. Control Example

Figure 8:
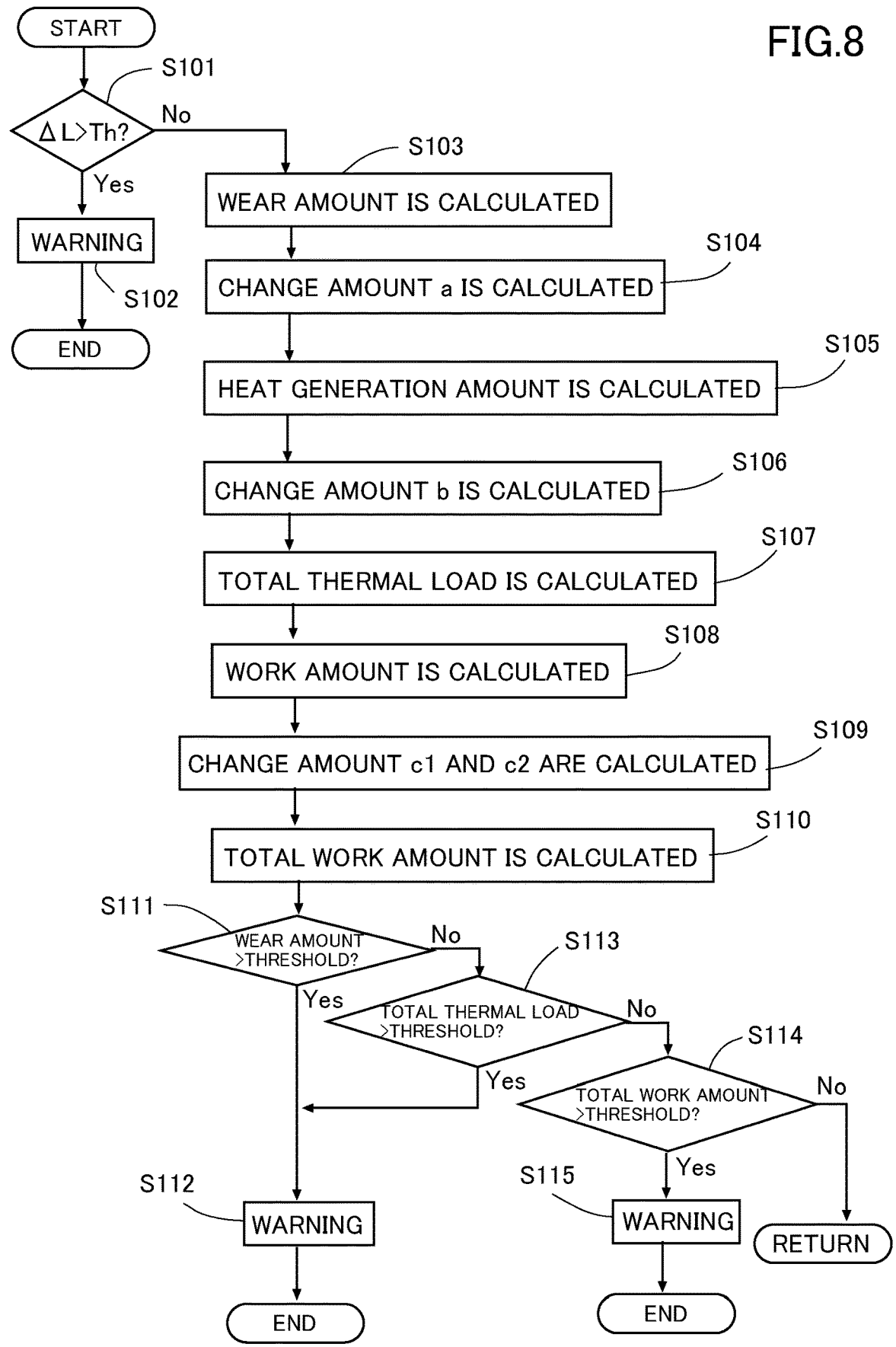
FIG. 8 is a flowchart illustrating one control example according to the embodiment.

Referring to FIG. 8, there will be described one example of a fluid-leakage determination program and a replacement-timing determination program executed by the controller 8. It is initially determined whether the present fluid-level change amount ΔL, which is a difference between the present fluid level and the initial fluid level, is greater than the fluid leakage threshold Th (S101). In the initial determination, the fluid leakage threshold Th is the constant X (Th=X−a+b−c1−c2). When the present fluid-level change amount ΔL is greater than the fluid leakage threshold Th (S101: Yes), it is determined that the fluid leakage is occurring. In this case, there is executed a process that is to be executed upon occurrence of the fluid leakage, such as outputting the warning (S102).

When the present fluid-level change amount ΔL is not greater than the fluid leakage threshold Th (S101: No), the replacement-timing determination program is executed to calculate or estimate the wear amount of the brake pads 93

(S103). Based on the calculated wear amount and the first map, the fluid-level change amount "a" is calculated (S104). The heat generation amount of the brake pads 93 is calculated or estimated (S105). Based on the calculated heat generation amount and the second map, the fluid-level change amount "b" is calculated (S106). Based on the calculated heat generation amount, the total heat generation amount of the brake pads 93 is calculated (S107).

The work amount of each motor 22b, 58b, 11a is calculated (S108). The fluid-level change amount "c1" is calculated based on the wheel pressure and the third map, and the fluid-level change amount "c2" is calculated based on the clamping force of the electric parking brake 11 and the fourth map (S109). The total work amount (i.e., the integrated value) of each motor 22b, 58b, 11 a is calculated (S110). In this way, the controller 8 calculates the fluid-level change amounts a, b, c1, c2, the total heat generation amount, and the total work amount of each motor 22b, 58b, 11a. The order of the calculations may be suitably changeable. For instance, the calculations may be carried out simultaneously.

It is subsequently determined whether the wear amount of the brake pads 93 is greater than a threshold that is set in advance (S111). When the wear amount is greater than the threshold (S111: Yes), the warning as to replacement of the brake pads 93 is issued to the vehicle driver (S112). When the wear amount is not greater than the threshold (S111: No), it is determined whether the total heat generation amount of the brake pads 93, namely, the total thermal load of the brake pads 93, is greater than the threshold (S113). When the total thermal load is greater the threshold (S113: Yes), the warning as to replacement of the brake pads 93 is issued to the vehicle driver (S112).

When the total thermal load is not greater than the threshold (S113: No), it is determined whether the total work amount of each motor 22b, 58b, 11a is greater than a threshold set for each motor 22b, 58b, 11 a (S114). When any of the total work amounts is greater than the corresponding threshold (S114: Yes), the warning concerning the corresponding motor 22b, 58b, 11a is issued to the vehicle driver (S115). When all of the total work amounts are not greater than the corresponding thresholds (S114: No), the program ends and returns back to the start of the program. The calculated values a, b, c1, c2 are utilized in next fluid-leakage determination (S101). The controller 8 repeatedly executes the fluid-leakage determination program and the replacement-timing determination program illustrated in FIG. 8 at a short cycle.

Examples of Fluid-Level Change and Hydraulic-Pressure Change

Figure 9:
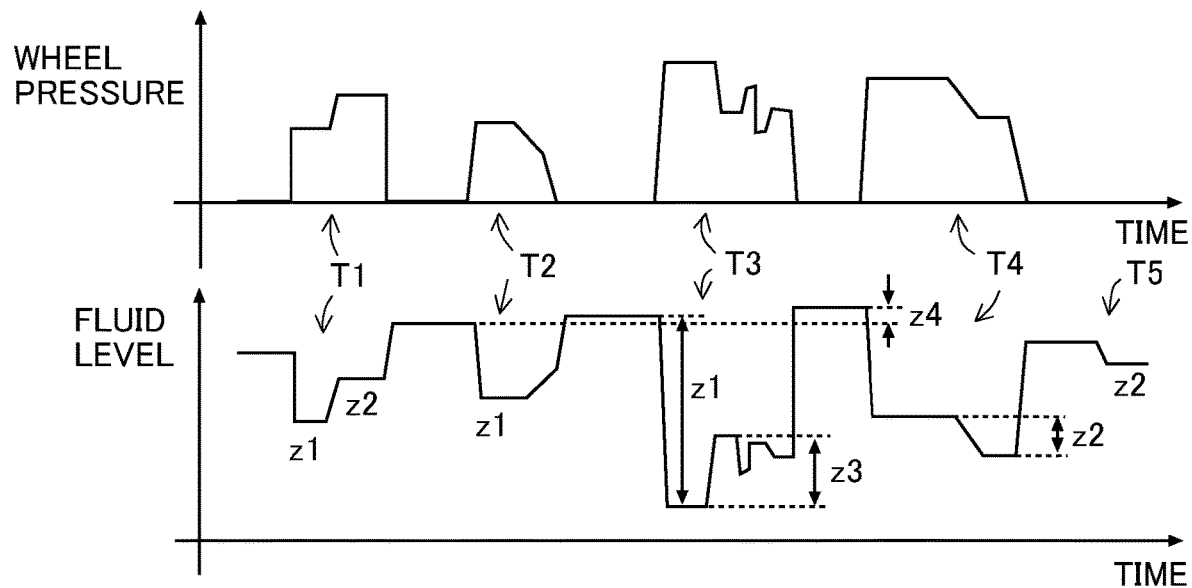
FIG. 9 is a time chart illustrating a change in a fluid level and a change in a wheel pressure according to the embodiment.

Referring to FIG. 9, there will be briefly described a change in the wheel pressure and a change in the fluid level in the reservoir 20. In FIG. 9, the factors responsible for the change in the fluid level are illustrated as follows. A change "z1" is a change that arises from the hydraulic-pressure control, namely, the control load. A change "z2" is a change that arises from the operation of the electric parking brake 11, namely, the operational load. A change "z3" is a change that arises from an ABS control, namely, ABS load. A change "z4" is a change that arises from thermal expansion of the brake pads 93.

In a time period T1, the brake pedal 16 is depressed and the ignition is turned on in a state in which the electric parking brake 11 is locked, so that the wheel pressure is increased and the fluid level is accordingly reduced. Subsequently, when the electric parking brake 11 is released or turned off and the piston 95 moves backward, the hydraulic-pressure chamber 94a is narrowed, so that the wheel pressure is increased and the fluid level is increased. Subsequently, the brake operation is canceled, the wheel pressure is lowered, and the fluid level is increased. The fluid level at the time when the braking force is 0 is higher than that before the start of the brake operation by an amount that results from releasing of the electric parking brake 11.

In a time period T2, the wheel pressure is increased in response to a braking request, so that the fluid level is lowered. Subsequently, the braking request is canceled, the wheel pressure is decreased, and the fluid level is increased. In a time period T3, the wheel pressure is increased and the fluid level is decreased in response to a braking request. Thereafter, the ABS control is executed, and the second system 14 is operated. In this case, the wheel pressure and the fluid level change in conjunction with each other. The braking request is then canceled, the wheel pressure is decreased, and the fluid level is increased. The fluid level at the time when the braking force is 0 is increased due to the thermal expansion of the brake pads 93 every time when the brake operation is performed.

In a time period T4, the brake operation for stopping the vehicle is performed. In this case, the wheel pressure is increased, and the fluid level is decreased. After the vehicle stops, the electric parking brake 11 is turned on, and the piston 95 moves forward to enlarge the hydraulic-pressure chamber 94a, so that the wheel pressure is decreased and the fluid level is decreased. Subsequently, the braking request is canceled, the wheel pressure is decreased, and the fluid level is increased. In a time period T5, reclamping by the electric parking brake 11 is carried out, so that the fluid level is decreased. This reclamping resets the influence on the clamping force due to the change in the thickness of the brake pads 93 after having been cooled, and the clamping force is maintained.

The increase in the wheel pressure in the time periods T1-T4 is brought about by the first system 12, namely, by the load of the pump motor 22b, and the ABS control and an ESC (skid prevention) control are executed by the second system 14. The controller 8 monitors and grasps the operations of the systems 12, 14. In a case where the second system 14 (the pump motor 58b) is driven while the brake pedal 16 is being operated, the driving does not cause any change in the fluid level because the reservoir 20 and the second system 14 are isolated from each other, but the stroke of the brake pedal 16 changes. Thus, the controller 8 can estimate the work amount of the pump motor 58b based on the operating status of the pump motor 58b and the results of detection by the stroke sensors 102a, 102b.

The present disclosure may be represented as follows.

(1) A brake device for a vehicle, including a fluid supply portion that supplies a fluid to a wheel cylinder utilizing the fluid in a reservoir, the brake device being configured such that a piston presses brake pads against a disc rotor in accordance with a hydraulic pressure in the wheel cylinder, so as to apply a braking force to a wheel, the brake device including:
    a fluid level sensor configured to measure a value of a fluid level in the reservoir;
    a wear-amount estimating portion configured to estimate a wear amount of the brake pads based on a result of measurement by the fluid level sensor;
    a heat-generation-amount estimating portion configured to estimate a heat generation amount of the brake pads based on the result of measurement by the fluid level sensor; and a fluid-leakage determining portion configured to determine whether a leakage of the fluid is occurring based on i) an amount of change in the fluid level that is based on the result of measurement by the fluid level sensor, ii) the wear amount, and iii) the heat generation amount.

(2) The brake device according to the above form (1), further including a WC reduction-amount estimating portion configured to estimate, based on the hydraulic pressure in the wheel cylinder, a WC reduction amount that is an amount of reduction in the fluid level arising from an operation of the fluid supply portion,
wherein the fluid-leakage determining portion is configured to determine whether the leakage of the fluid is occurring also based on the WC reduction amount.

(3) The brake device according to the above form (1) or (2), further including:
an electric parking brake configured to move the piston by a force of an electric motor; and
an EPB reduction-amount estimating portion configured to estimate, based on a clamping force of the electric parking brake, an EPB reduction amount that is an amount of reduction in the fluid level arising from an operation of the electric parking brake,
wherein the fluid-leakage determining portion is configured to determine whether the leakage of the fluid is occurring also based on the EPB reduction amount.

(4) The brake device according to any one of the above forms (1)-(3), wherein the fluid-leakage determining portion stores in advance a first map representing a relationship between the wear amount and the amount of change in the fluid level and a second map representing a relationship between the heat generation amount and the amount of change in the fluid level.

(5) The brake device according to any one of the above forms (1)-(4), further comprising a pad replacement-timing determining portion configured to determine timing of replacement of the brake pads based on at least one of the wear amount and the heat generation amount.

(6) The brake device according to any one of the above forms (1)-(5), further including:
a work-amount estimating portion configured to estimate a work amount of a pump motor of the fluid supply portion and a total wok amount that is an integrated value of the work amount, based on the result of measurement by the fluid level sensor and the hydraulic pressure in the wheel cylinder; and
a motor replacement-timing determining portion configured to determine timing of replacement of the pump motor based on the total work amount.

(7) The brake device according to the above form (6), wherein the work-amount estimating portion is configured to estimate the work amount based on the amount of change in the fluid level per unit time and an amount of change in the hydraulic pressure in the wheel cylinder per unit time.

(8) The brake device according to any one of the above forms (1)-(7), further including:
an electric parking brake configured to move the piston by a force of an electric motor;
an EPB work-amount estimating portion configured to estimate an EPB work amount that is a work amount of the electric motor and a total EPB work amount that is an integrated value of the EPB work amount, based on the result of measurement by the fluid level sensor and the hydraulic pressure in the wheel cylinder; and an EPB replacement-timing determining portion configured to determine timing of replacement of the electric motor based on the total EPB work amount.

(9) The brake device according to the above form (8), wherein the EPB work-amount estimating portion is configured to estimate the EPB work amount based on the amount of change in the fluid level per unit time and an amount of change in the hydraulic pressure in the wheel cylinder per unit time.

(10) The brake device according to the above form (1),
wherein the fluid-leakage determining portion determines that the leakage of the fluid is occurring when a difference between an initial fluid level that is the fluid level initially measured and a present fluid level that is the fluid level presently measured is greater than a fluid leakage threshold, and
wherein the fluid-leakage determining portion decreases the fluid leakage threshold based on the wear amount and increases the fluid leakage threshold based on the heat generation amount.

(11) The brake device according to the above form (2),
wherein the fluid-leakage determining portion determines that the leakage of the fluid is occurring when a difference between an initial fluid level that is the fluid level initially measured and a present fluid level that is the fluid level presently measured is greater than a fluid leakage threshold, and
wherein the fluid-leakage determining portion decreases the fluid leakage threshold based on the wear amount and the WC reduction amount and increases the fluid leakage threshold based on the heat generation amount.

(12) The brake device according to the above form (11), further including:
an electric parking brake configured to move the piston by a force of an electric motor; and
an EPB reduction-amount estimating portion configured to estimate, based on a clamping force of the electric parking brake, an EPB reduction amount that is an amount of reduction in the fluid level arising from an operation of the electric parking brake,
wherein the fluid-leakage determining portion decreases the fluid leakage threshold based on the wear amount, the WC reduction amount, and the EPB reduction amount and increases the fluid leakage threshold based on the heat generation amount.

Modification

Figure 10:
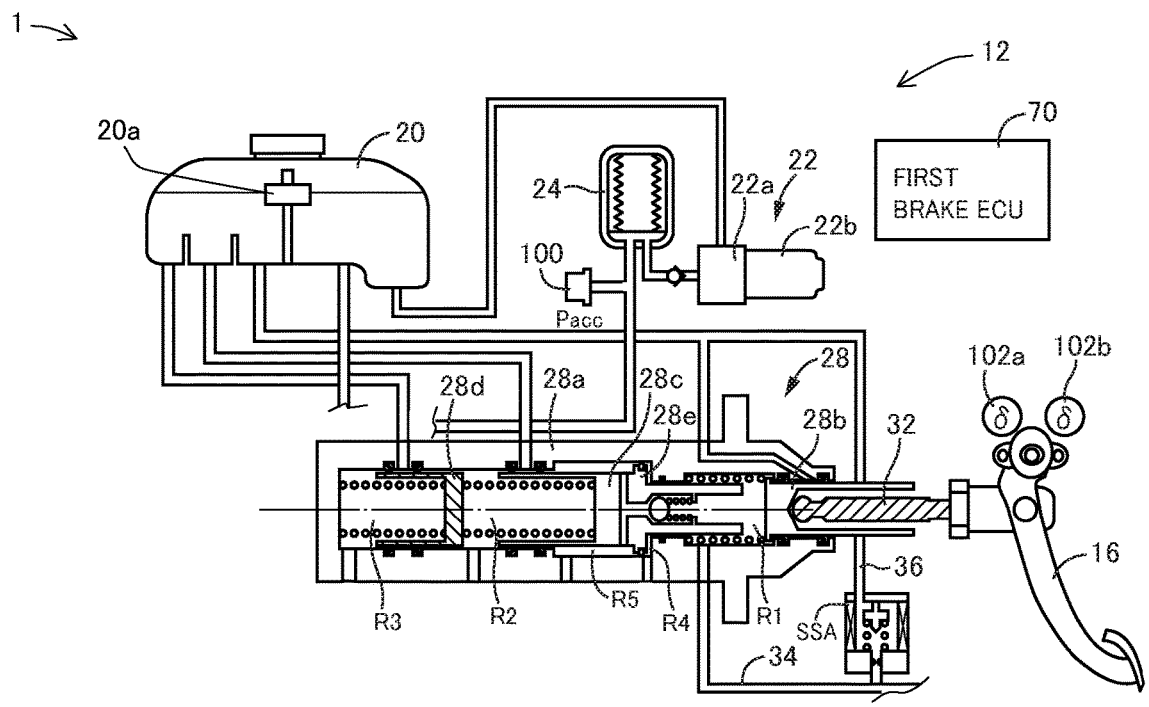
FIG. 10 is a conceptual view illustrating a configuration of a first system equipped with an accumulator.

The present disclosure is not limited to the details of the embodiment illustrated above. As illustrated in FIG. 10, the first system 12 may include, for instance, an accumulator 24, which is a high-pressure source. The accumulator 24 is disposed between the first pump device 22 and the pressure-increasing linear valve SLA. Owing to the action of the first pump device 22 configured to pump up the fluid in the reservoir 20, the accumulator 24 stores the fluid having a high-pressure ranging from a predetermined lower limit pressure to a predetermined upper limit pressure. When the pressure-increasing linear valve SLA is opened, the high-pressure fluid is supplied from the accumulator 24 to the first pilot chamber R6 to move the spool 30c, so that the high-pressure port P2 and the regulated-pressure port P3 are brought into communication with each other. As a result, the high-pressure fluid is supplied from the accumulator 24 to the servo chamber R4 through the ports P2, P3, so that the servo pressure is increased to move the master pistons 28c, 28d forward. Thus, the master pressure is increased.

A hydraulic pressure in the accumulator 24 (hereinafter referred to as "accumulator pressure" where appropriate) is detected by a pressure sensor 100. Owing to the action of the first pump device 22, the fluid is supplied in advance from the reservoir 20 to the accumulator 24, regardless of the presence or absence of a braking request, such that the accumulator pressure is higher than or equal to a predetermined lower limit value. In the first system 12 equipped with the accumulator 24, therefore, timing of decrease of the fluid level in the reservoir 20 and timing of increase of the wheel pressure differ from each other in some case. The first pump device 22 stops operating when the accumulator pressure becomes equal to a predetermined value (lower limit value≤predetermined value≤upper limit value). Thus, it is possible to estimate the work amount of the pump motor 22b by permitting the controller 8 to monitor the fluid-level change amount and the operating status of the pump motor 22b (and the accumulator pressure, for instance). The reduction-amount estimating portion 83 can estimate the reduction amount of the fluid level based on the wheel pressure and the accumulator pressure, for instance.

In the system having the accumulator 24, the fluid amount pumped up by the pump for the accumulator (i.e., the first pump device 22) and the pressure required for pumping up the fluid can be estimated by calculation. In a time period from when the fluid in the accumulator 24 starts reducing by the brake actuation to when the first pump device 22 is operated next time, the fluid amount remaining in the accumulator 24 is unavailable. It is thus difficult to determine which one of the following three factors is responsible for the change in the fluid level in the reservoir 20 caused at the time of the brake release: (1) The change is caused by the fluid amount returned to the reservoir 20 from the accumulator 24 by the brake release; (2) The change is caused by the piston 95 that has been pushed backward by the thermal expansion of the brake pads 93; and (3) The change is caused by the piston 95 that has moved forward due to the wear of the brake pads 93. Due to the factor (2), the fluid level is increased. Due to the factor (3), the fluid level is reduced.

The controller 8 monitors when the first pump device 22 is operating. Thus, the fluid in the accumulator 24 is constant immediately after the first pump device 22 has pumped up the fluid, namely, immediately after the first pump device 22 has finished operating such as immediately after the accumulator pressure has become equal to the predetermined value (lower limit value≤predetermined value≤upper limit value). It is accordingly possible to determine which one of the factors (1)-(3) described above is responsible for the change in the fluid level. As for the thermal expansion of the brake pads 93, it is considered that the fluid level does not largely change if the number of times braking is performed is small (once or twice, for instance). Thus, the effect of the thermal expansion in this case can be set to be negligible. As for the wear of the brake pads 93, braking needs to be performed at a high-pressure for a long length of time for large wear of the brake pads 93. In this case, it is considered that the first pump device 22 operates several times during braking. In this way, a factor determination pattern (conditions) for each event can be preset in the controller 8. By comparing the fluid levels between immediately after completion of an n-th time operation of the first pump device 22 and immediately after completion of an (n+1)-th time operation of the first pump device 22 or by comparing the fluid levels before and after the operation of the first pump device 22, the system according to this modification is capable of performing various calculations (estimations), like the on-demand system of the illustrated embodiment. For instance, each time when the first pump device 22 finishes operating, the controller 8 may detect the fluid level and may calculate the change amount of the fluid level.

As for the operation of the electric parking brake 11, in a state in which the hydraulic brake by the systems 12, 14 is not operating and the reservoir 20 and the wheel cylinder 94 are held in communication with each other, it is possible to detect the change in the fluid level arising from the electric parking brake 11 without taking account of the influence of the accumulator 24. As for the operation of the electric parking brake 11 when the hydraulic brake by the systems 12, 14 is operating, various calculations can be performed by regarding the change in the fluid level as being caused due to the operation of the electric parking brake 11 as long as the first pump device 22 does not operate concurrently with the operation of the electric parking brake 11. Even in a case where the first pump device 22 operates concurrently with the operation of the electric parking brake 11, the calculations can be performed with a certain degree of accuracy by measuring and storing, in advance, the rate of change in the fluid level due to the operation of the first pump device 22 and by regarding a difference between the stored rate of change and the currently calculated rate of change as the change amount of the fluid level due to the operation of the electric parking brake 11. In FIG. 10, part of the configuration including the second system 14 is not illustrated.

What is claimed is:

1. A brake device for a vehicle comprising a fluid supply portion that supplies a fluid to a wheel cylinder utilizing the fluid in a reservoir, the brake device being configured such that a piston presses brake pads against a disc rotor in accordance with a hydraulic pressure in the wheel cylinder, so as to apply a braking force to a wheel, the brake device comprising:
    a fluid level sensor configured to measure a value of a fluid level in the reservoir; and
    a controller including one or more processors and configured to:
        estimate a wear amount of the brake pads based on a result of measurement by the fluid level sensor;
        estimate a heat generation amount of the brake pads based on the result of measurement by the fluid level sensor; and
        determine whether a leakage of the fluid is occurring based on i) an amount of change in the fluid level that is based on the result of measurement by the fluid level sensor, ii) the wear amount, and iii) the heat generation amount.

2. The brake device according to claim 1,
    wherein the controller is configured to:
        estimate, based on the hydraulic pressure in the wheel cylinder, a WC reduction amount that is an amount of reduction in the fluid level arising from an operation of the fluid supply portion; and
        determine whether the leakage of the fluid is occurring also based on the WC reduction amount.

3. The brake device according to claim 2,
    wherein the controller determines that the leakage of the fluid is occurring when a difference between an initial fluid level that is the fluid level initially measured and a present fluid level that is the fluid level presently measured is greater than a fluid leakage threshold, and
    wherein the controller is configured to decrease the fluid leakage threshold based on the wear amount and the WC reduction amount and increase the fluid leakage threshold based on the heat generation amount.

4. The brake device according to claim 3, further comprising an electric parking brake configured to move the piston by a force of an electric motor,
wherein the controller is configured to:
estimate, based on a clamping force of the electric parking brake, an EPB reduction amount that is an amount of reduction in the fluid level arising from an operation of the electric parking brake; and
decrease the fluid leakage threshold based on the wear amount, the WC reduction amount, and the EPB reduction amount and increase the fluid leakage threshold based on the heat generation amount.

5. The brake device according to claim 1, further comprising an electric parking brake configured to move the piston by a force of an electric motor,
wherein the controller is configured to:
estimate, based on a clamping force of the electric parking brake, an EPB reduction amount that is an amount of reduction in the fluid level arising from an operation of the electric parking brake; and
determine whether the leakage of the fluid is occurring also based on the EPB reduction amount.

6. The brake device according to claim 1, wherein the controller stores in advance a first map representing a relationship between the wear amount and the amount of change in the fluid level and a second map representing a relationship between the heat generation amount and the amount of change in the fluid level.

7. The brake device according to claim 1, wherein the controller is configured to determine timing of replacement of the brake pads based on at least one of the wear amount and the heat generation amount.

8. The brake device according to claim 1,
wherein the controller is configured to:
estimate a work amount of a pump motor of the fluid supply portion and a total work amount that is an integrated value of the work amount, based on the result of measurement by the fluid level sensor and the hydraulic pressure in the wheel cylinder; and
determine timing of replacement of the pump motor based on the total work amount.

9. The brake device according to claim 8, wherein the controller is configured to estimate the work amount based on the amount of change in the fluid level per unit time and an amount of change in the hydraulic pressure in the wheel cylinder per unit time.

10. The brake device according to claim 1, further comprising an electric parking brake configured to move the piston by a force of an electric motor,
wherein the controller is configured to:
estimate an EPB work amount that is a work amount of the electric motor and a total EPB work amount that is an integrated value of the EPB work amount, based on the result of measurement by the fluid level sensor and the hydraulic pressure in the wheel cylinder; and
determine timing of replacement of the electric motor based on the total EPB work amount.

11. The brake device according to claim 10, wherein the controller is configured to estimate the EPB work amount based on the amount of change in the fluid level per unit time and an amount of change in the hydraulic pressure in the wheel cylinder per unit time.

12. The brake device according to claim 1,
wherein the controller determines that the leakage of the fluid is occurring when a difference between an initial fluid level that is the fluid level initially measured and a present fluid level that is the fluid level presently measured is greater than a fluid leakage threshold, and
wherein the controller is configured to decrease the fluid leakage threshold based on the wear amount and increase the fluid leakage threshold based on the heat generation amount.

\* \* \* \* \*